Sept. 13, 1966  J. R. SCHUETZ  3,272,280
TRANSMISSION AND STEERING CONTROL MECHANISM
FOR MATERIAL HANDLING VEHICLE
Filed May 25, 1964
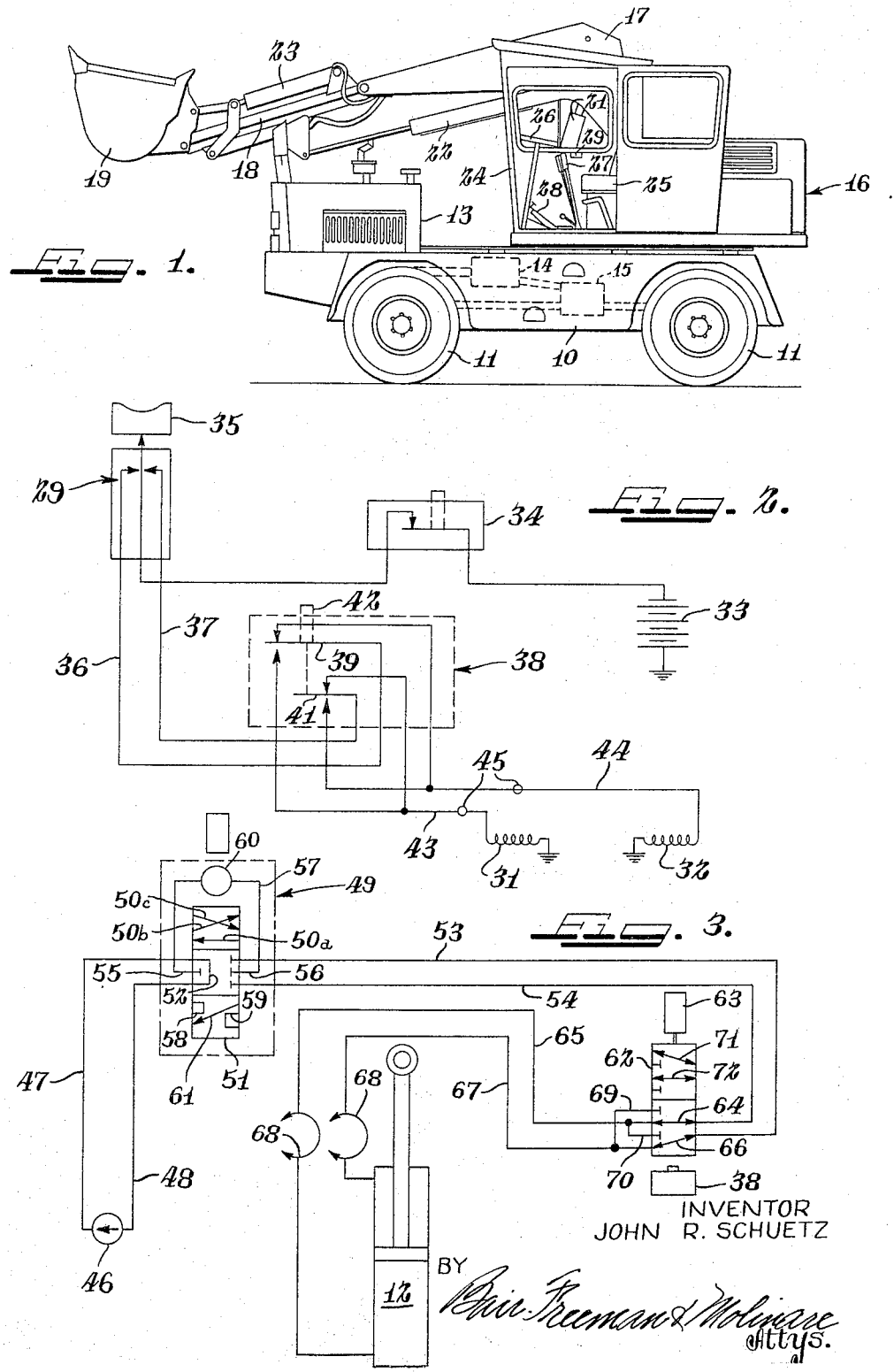
INVENTOR
JOHN R. SCHUETZ United States Patent Office 3,272,280
Patented Sept. 13, 1966

3,272,280
TRANSMISSION AND STEERING CONTROL MECHANISM FOR MATERIAL HANDLING VEHICLE
John R. Schuetz, Wausau, Wis., assignor to Drott Manufacturing Corporation, Milwaukee, Wis., a corporation of Wisconsin
Filed May 25, 1964, Ser. No. 369,855
3 Claims. (Cl. 180—77)

This invention relates to control systems for vehicles and more particularly to a transmission and steering control for material handling vehicles in which the operator may face either forward or backward.

Material handling vehicles have heretofore been proposed in which an upper frame carrying material handling devices and an operator's compartment is mounted for swiveling about a vertical axis on a lower frame supported on driving and steering wheels. In such vehicles the upper and lower frames generally have one relatively aligned position for transport and a generally reversed position for working. In other words, the upper frame is turned to work off the back or rear side portions of the lower frame for most operations.

This means that the transmission forward and reverse control and the steering controls must work backward in one position, thereby making it confusing and difficult for the operator to control the vehicle properly. Under stress of trying to work rapidly or adverse traffic conditions, confusion of the operator could create dangerous situations and is very apt to slow up his operations of the vehicle.

It is accordingly one of the objects of the present invention to provide a control system for vehicles in which either or both the transmission and steering controls can be reversed in their action so that the same natural control operations are performed in either of the reversed positions.

Another object is to provide a control system for vehicles in which reversing devices for the transmission and steering controls are operatively connected for simultaneous operation.

In a preferred construction one of the reversing devices is a reversing valve connected in the fluid lines to a fluid operated motor and the other reversing device is a reversing switch in electrical connections between the normal electrical control switch and an electric power device.

The above and other objects and features of the invention will be more readily apparent from the following description when read in connection with the accompanying drawing, in which:

FIG. 1 is a side elevation of a vehicle embodying the invention;

FIG. 2 is an electric circuit diagram; and

FIG. 3 is a hydraulic circuit diagram.

The vehicle, as illustrated generally in FIG. 1, comprises a lower frame 10 supported on wheels 11 at the front and rear of the frame with the front wheels preferably being steerable. Steering of the front wheels is preferably controlled hydraulically through a hydraulic steering motor, shown at 12 in FIG. 3.

An engine, indiciated generally at 13, is mounted on the forward end of the vehicle and is drivably connected to the wheels through a reversing transmission, indicated at 14, and a change speed transmission, indicated at 15. It will be understood that the change speed transmission is connected to driving axles for the wheels through the usual differential devices and driving shafts, not shown.

An upper frame, indicated generally at 16, is mounted on the lower frame for turning about a vertical swivel axis. Preferably the upper frame is so mounted that it can turn through a complete revolution and preferably through more than one revolution for convenience in performing various material handling or loading operations. The upper frame carries a material handling device, shown as a shovel mechanism, including an arm 17 mounted for swinging in a vertical plane on the upper frame, an arm 18 pivoted to the outer end of the arm 17 and a shovel or bucket 19 pivotally carried by the arm 18. The arm 17 is swung vertically by a hydraulic cylinder 21, the arm 18 is swung about its pivotal connection to the arm 17 by a hydraulic cylinder 22 and the bucket or shovel may be turned about its connection to the arm 18 by a hydraulic cylinder 23.

The several operations of the vehicle and the material handling mechanism thereon may conveniently be controlled by an operator seated in an operator's cab 24 mounted on the upper frame. As shown, the cab contains an operator's seat 25, a steering wheel 26 for controlling steering of the vehicle and various control levers and pedals 27 and 28 for controlling other functions of the vehicle. When the steering wheel 26 is turned it operates a main steering valve which controls the supply and exhaust of operating fluid to the cylinder 12 to turn the steerable wheels. The reversible transmission 14 is preferably controlled electrically through an electric switch 29 mounted in the cab for convenient operation by the operator. The change speed transmission 15 is preferably controlled through one or more of the levers 27 so that the speed can be changed when the upper frame is turned to its forward position, as shown in FIG. 1, as more particularly described and claimed in the co-pending application of John R. Schuetz, Serial No. 359,075, filed April 13, 1964. The angular position of the upper frame relative to the lower frame may also be controlled from the operator's cab with the upper frame being turned on the lower frame by a suitable power device, not shown.

FIG. 2 illustrates the electrical circuit for controlling the reversing transmission 14 through the switch 29 and through a reversing switch. As shown, two coils 31 and 32 may be selectively energized to shift the reversing transmission to one condition or the other for drive of the vehicle forwardly or in a reverse direction. When both coils are de-energized the transmission is in neutral so that there will be no drive in either direction.

The switch 29, as shown, is a double throw switch whose movable contact is connected to a source of power, such as a battery 33, through an on-off switch 34. An actuating tilt button 35 will move the movable contact to switch 29 to one side or the other or to a neutral position. When moved to one side or the other the movable contact will establish a circuit with either a wire 36 or a wire 37 to energize one or the other of the coils 31 and 32.

Connection of the wires 36 and 37 to the coils is made through a reversing switch 38 having two movable contact members 39 and 41 connected respectively to the wires 36 and 37. The contact members 39 and 41 are connected together for simultaneous movement normally occupying a raised position, as shown, and being movable to a lowered position by an operating button 42. Each of the contact members is adapted to make contact selectively with upper and lower contacts which are connected to wires 43 and 44 leading to the coils 31 and 32 and preferably including slip ring contactors 45 which will accommodate relative rotation between the upper and lower frames. When the movable contacts 39 and 41 are in their normal upper positions, as shown, the contact 39 will connect the wire 36 to the wire 44 leading to the coil 32 and the contact 41 will connect the wire 37 to the wire 43 leading to the coil 31. When the button 42 is depressed the connections will be reversed so that the wire 36 is connected to the coil 31 and the wire 37 is connected to the coil 32. Therefore, operation of the forward and reverse control button 35 will be reversed.

The steering cylinder 12 is controlled through a hydraulic circuit, as best shown in FIG. 3, to control the supply of actuating fluid thereto from a pump 46 driven by the engine 13. The pump has an outlet line 47 and a return line 48 terminating in spaced valve ports in a valve, indicated generally at 49, which is operated by the steering wheel 26. This valve, as shown in FIG. 3, comprises a movable spool 51 movable to three different positions for cutting off supply of fluid to the cylinder 12 or for supplying fluid thereto in one direction or another. In the neutral position of the valve, as shown, a passage 52 therein interconnects the lines 47 and 48 so that the pump 46 can operate idly. Lines 53 and 54 which lead from the valve to the hydraulic cylinder 12 are blocked so that the hydraulic cylinder 12 is held in a locked position and the wheels will be restrained against turning. The valve and valve spool are provided with intermediate ports 55 and 56 which are blocked, as shown, in the neutral position of the valve. The ports 55 and 56 are interconnected by a conduit 57, in which a metering control valve 60 is connected, as shown.

When the valve is shifted downward, the lower port communicating with the conduit 48 is directly connected to the conduit 54 through a passage 50a, the intermediate port 55 is connected to the upper conduit 53 through a passage 50b and the supply line 47 is connected to the port 56 through a passage 50c. At this time, liquid will flow from the supply line 47 to port 56 and through conduit 57 and metering valve 60 to port 55 and then to conduit 53 to the hydraulic steering cylinder. Return fluid will flow directly from line 54 to the return conduit 48.

When the valve is shifted upwardly, the supply line 47 will be connected through a passage 58 to the port 55 and the port 56 will be connected through a similar passage 59 to the line 54. The line 53 will be connected directly through a passage 61 to the return line 48. In this position, therefore, the line 54 will receive pump pressure while the line 53 acts as the return line thereby reversing the action of the fluid pressure on the cylinder 12 and reversing the direction of steering. It will be understood that turning of the steering wheel shifts the valve and that the wheel may be turned either fully or to a partial extent to cause any desired degree of turning of the steering wheel.

The action of the steering wheel 26 on the cylinder 12 is reversed by a reversing valve having a movable spool 62 which is manually operated through an operating button 63. This is a two-position spool which in its normal position, as shown, provides a straight through passage 64 connecting the line 54 to a line 65 leading to the lower or large end of the steering cylinder 12. A similar passage 66 connects the line 53 to a line 67 leading to the smaller or piston rod end of the cylinder 12. Swivels 68 are provided in the lines 65 and 67 to transmit the operating fluid from the valves which are preferably on the upper frame to the steering cylinder, which is on the lower frame.

When the reversing valve 62 is moved downwardly to its reversing position, the line 67 will be connected through a port 69 and a passage 71 with the line 54 and the line 65 will be directly connected through an offset port 70 and through a passage 72 with the line 53. It will be noted that in the normal position, as shown, the offset ports 69 and 70 are blocked while in the reversed position the lines 65 and 67 are blocked, except for the offset ports. Therefore, when the reversing valve is depressed, the flow of fluid as between lines 53 and 54 on one hand and lines 65 and 67 on the other hand will be reversed so that the steering effect produced by turning the steering wheel 26 will be reversed.

According to one feature of the invention the transmission control and steering control are simultaneously reversed. For this purpose, the reversing switch 38 is mounted adjacent to the valve 62 to be engaged and operated by the valve 62 when it is moved to its reverse position. Therefore, simply by manually shifting the valve 62 the operator reverses both the transmission control and the steering control.

In the normal transporting position, as shown in FIG. 1, in which the material handling device extends over the front end of the lower frame and the operator is facing forwardly, the controls will be in the full line position shown in FIGS. 2 and 3. At this time, operation of the transmission reversing control button to produce forward drive will cause the vehicle to move to the left, as seen in FIG. 1, and operation of the steering wheel 26 will turn the steerable wheels in the usual manner. When the upper frame is reversed relative to the lower frame to a working position, the operator may operate the reversing valve 62 simultaneously operating the reversing switch 38. Therefore, in this condition when he operates the transmission control button for forward drive the vehicle will actually move backward from left to right, as seen in FIG. 1, and the operation of the steerable wheels will be reversed so that when the operator desires to turn the back end of the vehicle from right to left, he will turn the steering wheel counter-clockwise in the normal manner. This reversal of the transmission control and steering control facilitates and simplifies operation of the vehicle minimizing the confusion of the operator and enabling him to function more rapidly and efficiently.

While one embodiment of the invention has been shown and described in detail, it will be understood that this is illustrative only and is not to be taken as a definition of the scope of the invention, reference being had for this purpose to the appended claims.

What is claimed is:

1. In combination with a vehicle having a lower frame, a reversible transmission on the lower frame, steerable wheels on the lower frame and an upper frame mounted on the lower frame for pivoting about a vertical axis, a control system comprising first power means on the lower frame connected to the transmission to reverse it, a manually operable control for the power means mounted on the upper frame, means including a first reversing device connecting the control to the power means, second power means mounted on the lower frame and connected to the steerable wheels to turn them, a second manually operable control for the second power means mounted on the upper frame, means including a second reversing device connecting the second control to the second power means, and means operatively connecting the first and second reversing devices for simultaneous operation.

2. The control system of claim 1 in which one of the reversing devices is manually operable and is mounted on the upper frame and the other reversing device is mounted adjacent to said one device to be engaged and operated thereby.

3. The control system of claim 1 in which one of the reversing devices is a manually operable valve mounted on the upper frame and the other reversing device is a switch mounted adjacent to the valve to be engaged and operated thereby.

References Cited by the Examiner

UNITED STATES PATENTS

| | | | |
|---|---|---|---|
| Re. 24,327 | 6/1957 | Lee | 74—360 |
| 1,268,910 | 6/1918 | Zelle. | |
| 2,949,162 | 8/1960 | Davis | 180—85 |
| 3,063,173 | 11/1962 | Wardle. | |
| 3,103,985 | 9/1963 | Price | 180—45 |

A. HARRY LEVY, *Primary Examiner.*

BENJAMIN HERSH, *Examiner.*

E. E. PORTER, *Assistant Examiner.*